United States Patent
Niemeyer et al.

(10) Patent No.: US 10,200,768 B2
(45) Date of Patent: Feb. 5, 2019

(54) LOW-LATENCY MOBILE DEVICE AUDIOVISUAL STREAMING

(71) Applicant: Microsoft Technology Licensing, LLC, Redmond, WA (US)

(72) Inventors: Daniel Diniz Niemeyer, Seattle, WA (US); Stefan Francis Slivinski, Mercer Island, WA (US); Quinn Damerell, Redmond, WA (US); Dylan Keith Garrett, Seattle, WA (US); Dharmanshu Kamra, Seattle, WA (US); Gerald Albert Pogue, Jr., Redmond, WA (US); Nicholas Jie Fang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/636,458

(22) Filed: Jun. 28, 2017

(65) Prior Publication Data
US 2018/0288499 A1    Oct. 4, 2018

Related U.S. Application Data

(60) Provisional application No. 62/479,184, filed on Mar. 30, 2017.

(51) Int. Cl.
*H04N 7/173*      (2011.01)
*H04N 21/8545*  (2011.01)
(Continued)

(52) U.S. Cl.
CPC ..... *H04N 21/8545* (2013.01); *H04N 21/4126* (2013.01); *H04N 21/432* (2013.01);
(Continued)

(58) Field of Classification Search
CPC ........... H04N 21/8545; H04N 21/4126; H04N 21/432; H04N 21/43637; H04N 21/4398;
(Continued)

(56) References Cited

U.S. PATENT DOCUMENTS

| 4,866,515 A | 9/1989 | Tagawa et al. |
| 9,467,972 B2 | 10/2016 | Bekiares et al. |

(Continued)

FOREIGN PATENT DOCUMENTS

WO     2004098735 A1    11/2004

OTHER PUBLICATIONS

"WebRTC—TutorialsPoint", https://www.tutorialspoint.com/webrtc/webrtc_tutorial.pdf, Published on: Mar. 27, 2016, pp. 1-182.
(Continued)

*Primary Examiner* — John R Schnurr
(74) *Attorney, Agent, or Firm* — Alleman Hall Creasman & Tuttle LLP

(57) ABSTRACT

A method for low-latency streaming of audio and video via a mobile computing device to facilitate a high-quality, real-time interactive streaming experience. The method includes receiving an application audio stream generated by execution of an application program, an application video stream generated by execution of the application program, a microphone audio stream, and a camera video stream. The application audio stream and the microphone audio stream are mixed to produce a mixed audio stream. The application video stream and the camera video stream are composited to produce a composited video stream. The mixed audio stream is encoded to produce an encoded audio stream, and the composited video stream is encoded to produce an encoded video stream. The encoded audio and video streams are packaged into one or more streaming packets, and output, to a remote computing device.

20 Claims, 7 Drawing Sheets

(51) Int. Cl.
*H04N 21/439* (2011.01)
*H04N 21/4402* (2011.01)
*H04N 21/6379* (2011.01)
*H04N 21/4363* (2011.01)
*H04N 21/432* (2011.01)
*H04N 21/61* (2011.01)
*H04N 21/41* (2011.01)

(52) U.S. Cl.
CPC ... *H04N 21/4398* (2013.01); *H04N 21/43637* (2013.01); *H04N 21/4402* (2013.01); *H04N 21/6131* (2013.01); *H04N 21/6379* (2013.01)

(58) Field of Classification Search
CPC ........... H04N 21/4402; H04N 21/6131; H04N 21/6379
See application file for complete search history.

(56) References Cited

U.S. PATENT DOCUMENTS

| | | | |
|---|---|---|---|
| 9,504,922 | B2 | 11/2016 | Lockton et al. |
| 2004/0116183 | A1* | 6/2004 | Prindle .................. A63F 13/12 463/42 |
| 2006/0012709 | A1 | 1/2006 | Yamada et al. |
| 2011/0292230 | A1* | 12/2011 | Winters ............. H04N 1/00137 348/222.1 |
| 2015/0119142 | A1 | 4/2015 | Abbott et al. |
| 2015/0290540 | A1 | 10/2015 | Trombetta et al. |
| 2017/0109122 | A1* | 4/2017 | Schmidt ................ G06F 3/1454 |

OTHER PUBLICATIONS

Doke, Shunal, "Twitch Introducing Streaming Toolset for Mobile Devices", http://www.ign.com/articles/2014/03/05/twitch-introducing-streaming-toolset-for-mobile-devices, Published on: Mar. 6, 2014, 4 pages.

"Go live from your mobile device", https://livestream.com/producer/mobile, Retrieved on: Mar. 28, 2017, 6 pages.

Michaels, Chris, "Latency Matters in Online Gaming", https://www.wowza.com/blog/latency-matters-in-online-gaming, Published on: Mar. 7, 2017, 9 pages.

Managuelod, Philline, "Best Live Video Streaming Apps for Mobile", https://www.dacast.com/blog/best-live-video-streaming-apps-mobile/, Retrieved on: Jun. 27, 2017, 21 pages.

Lentisco, et al., "Reducing Latency for Multimedia Broadcast Services over Mobile Networks", In Journal of IEEE Transactions on Multimedia, vol. 19, Issue 1, Jan. 2017, pp. 173-182.

Sime, Arin., "Live Streaming the Snowpocalypse with WebRTC", https://webrtc.ventures/2016/01/live-streaming-with-webrtc/, Published on: Jan. 29, 2016, 10 pages.

"International Search Report and Written Opinion Issued in PCT Application No. PCT/US2018/023906", dated Jul. 4, 2018, 11 Pages.

* cited by examiner

LOW-LATENCY MOBILE DEVICE AUDIOVISUAL STREAMING

CROSS REFERENCE TO RELATED APPLICATIONS

This application claims priority to U.S. Provisional Patent Application No. 62/479,184, filed Mar. 30, 2017, the entirety of which is hereby incorporated herein by reference.

BACKGROUND

Audiovisual streaming allows a user to broadcast audiovisual content to an audience of viewers via information networks, such as the Internet. Any sort of audiovisual content may be broadcast by a user to an audience of viewers. For example, a user may stream gameplay of a video game, user-generated programming (e.g., live shows, podcasts), electronic sports (E-sports), and other events (e.g., panels, press conferences, and show floor activities).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for low-latency streaming of audio and video via a mobile computing device to facilitate a high-quality, real-time interactive streaming experience. The method includes receiving an application audio stream generated by execution of an application program, an application video stream generated by execution of the application program, a microphone audio stream, and a camera video stream. The application audio stream and the microphone audio stream are mixed to produce a mixed audio stream. The application video stream and the camera video stream are composited to produce a composited video stream. The mixed audio stream is encoded to produce an encoded audio stream, and the composited video stream is encoded to produce an encoded video stream. The encoded audio and video streams are packaged into one or more streaming packets, and output, to a remote computing device.

DETAILED DESCRIPTION

Figure 1:
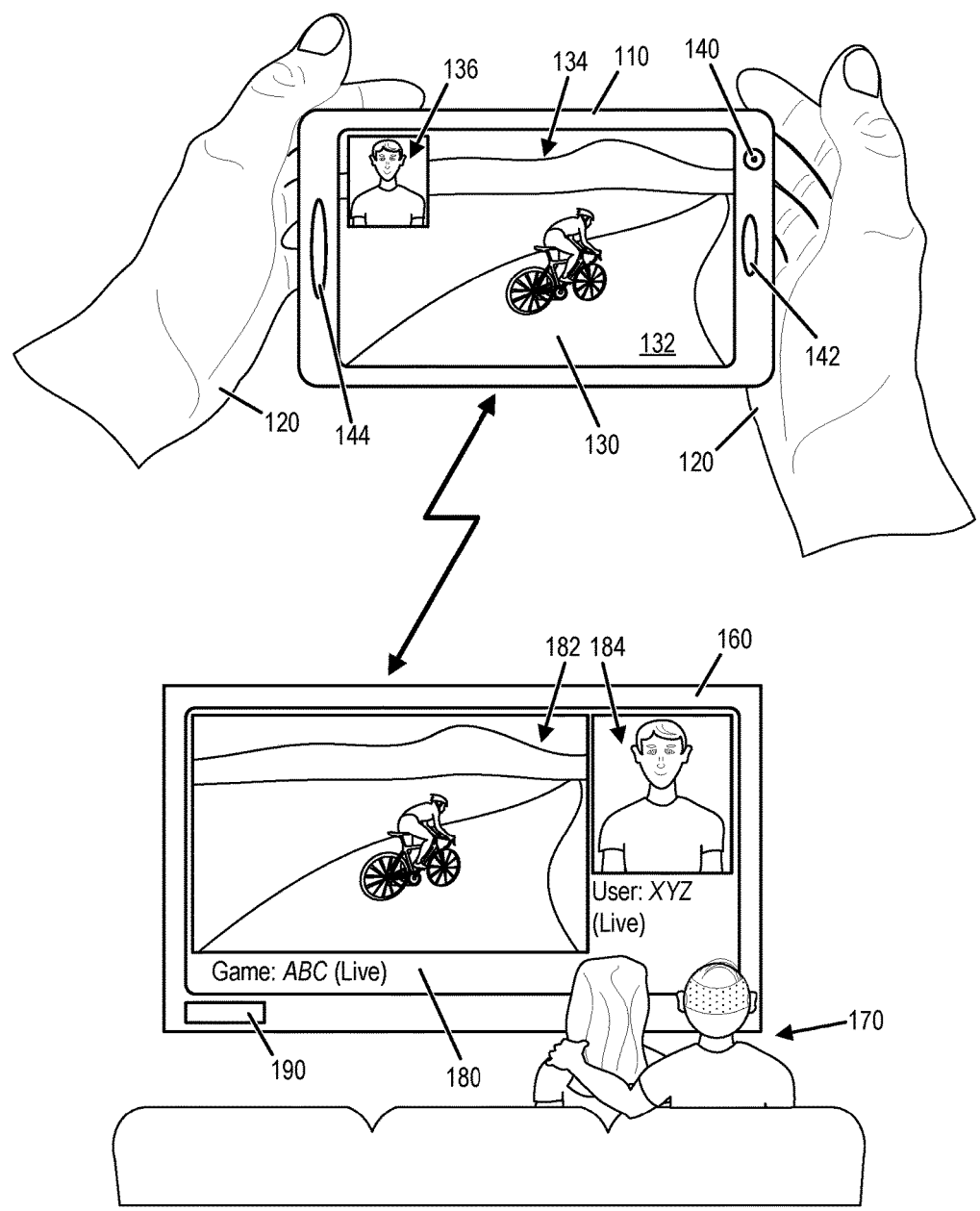
FIG. 1 depicts an example use-scenario in which a mobile computing device streams video game audio and video with game player audio and video to a remote device.

In some cases, audiovisual content may be streamed "live" to allow for audience interaction with a user while the user is streaming. In the context of this discussion, live means perceived as being real-time or approximating real-time. For example, different viewers may send questions and comments to the broadcasting user in a "chat" interface. The broadcasting user may then provide live commentary that answers questions and/or provides chat-relevant commentary. The interaction between the broadcasting user and the audience may be time sensitive. For example, when a broadcasting user is live streaming, the broadcasting user may receive instructions on how to play the video game from the audience. However, if the instructions are delayed due to high latency, the instructions may no longer be applicable to the current state of the video game. Moreover, delayed interactions between a broadcasting user and viewers due to high latency audiovisual streaming may result in a disjointed experience that is negatively perceived by the viewers.

Accordingly, the present disclosure relates to an approach for performing low-latency audiovisual streaming to enable a high-quality, real-time interactive streaming experience. In particular, an input audio stream is encoded via an audio encoder to produce an encoded audio stream. An input video stream is encoded via a video encoder to produce an encoded video stream. The audio encoder and the video encoder may provide separate unsynchronized time stamps, if the audio encoder and the video encoder have different clock references. Such temporal divergence could result in drift between the encoded audio stream and the encoded video stream. Therefore, a time stamp correction operation is performed to synchronize the encoded audio and video streams in order to prevent such drift. The encoded audio and video streams optionally may be further stripped of metadata generated by the video and/or audio encoders that is not needed for low-latency audiovisual streaming. The resulting synchronized, encoded audio and video streams are packaged together into streaming packets, and output, via a computer network, to a streaming server computing system for distribution to different viewer computing devices.

By performing the time stamp correction operation before the encoded audio and video streams are packaged together into streaming packets and distributed to viewer computing devices, the streaming packets may arrive at the viewer computing devices ready to be presented immediately. In other words, the viewer computing device does not have to extensively buffer and/or synchronize the audio and video streams prior to presentation.

On mobile computing device platforms with limited resources, the above described approach may be used to contend with raw audio and video input data. In particular, the raw audio and video data may be encoded, synchronized, and packaged together directly instead of utilizing multimedia containers (e.g., MP4) that would increase the latency to stream the audio and video data. In this way, substantially real-time streaming from a mobile computing device may be achieved.

FIG. 1 depicts an example use-scenario in which a mobile computing device 110 streams video game audio and video with game player audio and video to a remote device. In this example, mobile computing device 110, operated by a user 120, includes a graphical display device 130 that is presenting a graphical user interface (GUI) 132. GUI 132 may include one or more interfaces that form components of the GUI.

For example, GUI 132 may include a game interface 134 for a game program (i.e., a video game) being played by user 120 at mobile computing device 110. Game interface 134 may correspond to a game view presented during gameplay to user 120 as a game player of the game program. A visual representation of game interface 134 is streamed from mobile computing device to remote device 160 for presentation via a graphical display device 180 to one or more remote viewers 170 as graphical content 182. Graphical content 182 may take the form of a video of game interface 134.

Mobile computing device 110 may stream other visual content to remote device 160. For example, a visual representation of a camera view captured by a camera 140 of mobile computing device 110 may be streamed to remote device 160 for presentation via graphical display device 180 to remote viewers 170 as graphical content 184. Graphical content 184 may take the form of a video of the camera view captured by camera 140. In this example, the camera view includes user 120, thereby enabling remote viewers 170 to see a visual representation of user 120 alongside a visual representation of the game interface 134. This visual representation of user 120 may be referred to as game player video within the context of user 120 being a game player of a game program.

Another interface component of GUI 132 at mobile computing device 110 may include a camera view interface 136, which in this example includes the camera view captured by camera 140. Camera view interface 136 enables user 120 to see the camera view captured by camera 140, thereby assisting user 120 to align the camera view with a desired subject. Camera view interface 136 may be omitted from GUI 132 in at least some implementations.

Mobile computing device 110 may further include an audio speaker 142 and an audio microphone 144. Audio of the game program being played by user 120 may be output locally by audio speaker 142. Audio generated by user 120 and/or the user's surroundings, such as the user's spoken commentary, may be captured by microphone 144.

Audio representations of game audio of the game program and microphone audio captured by microphone 144 may be streamed by mobile computing device 110 to remote device 160 for presentation to remote viewers 170. Remote device 160 may output the audio of the game program and/or the audio captured remotely by microphone 144 via an audio speaker 190. Hence, remote viewers 170 may listen to game audio and microphone audio streamed from mobile computing device 110. Microphone audio capturing spoken commentary of user 120 may be referred to as game player audio within the context of user 120 being a game player of a game program.

Figure 2:
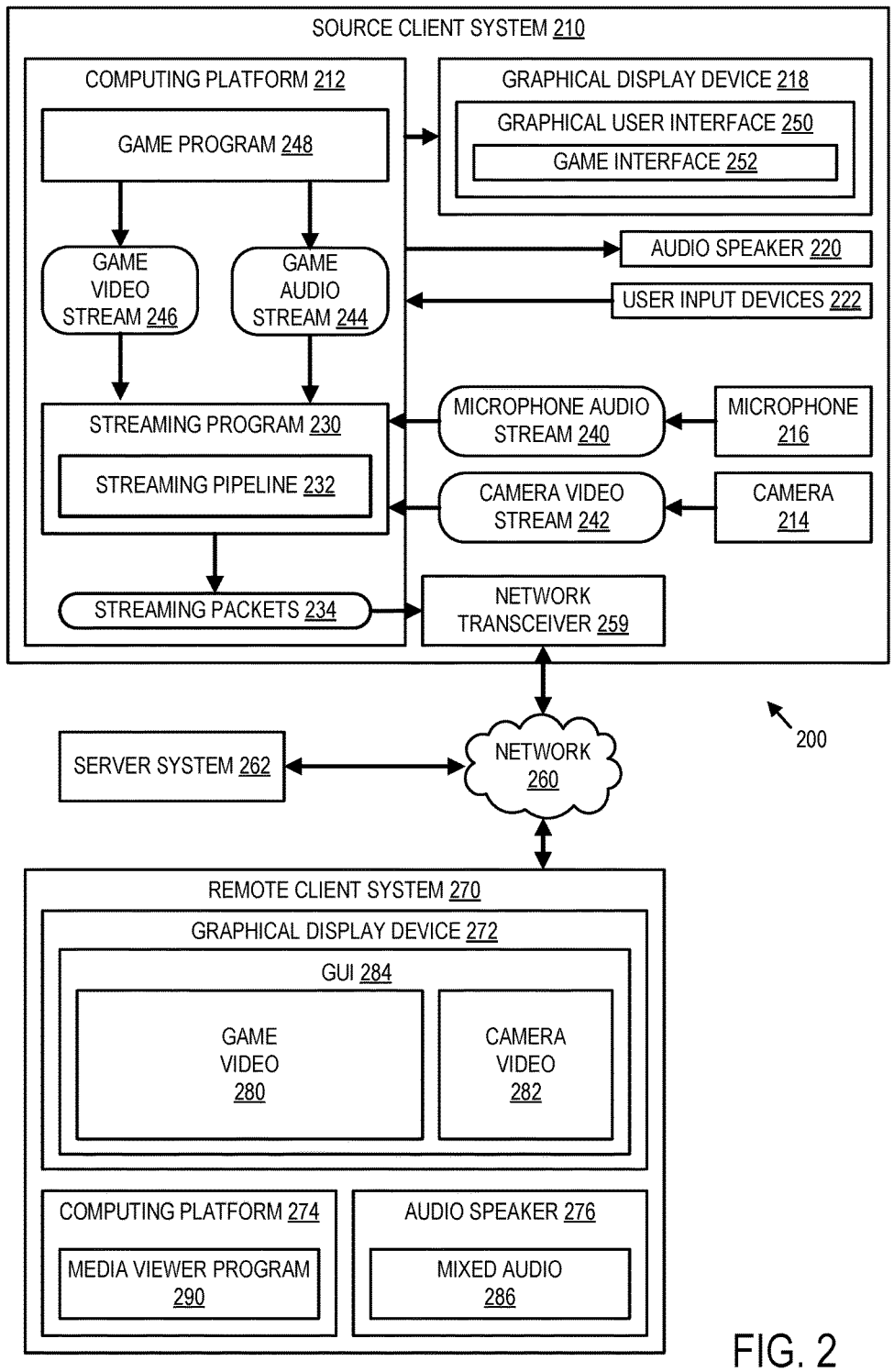
FIG. 2 schematically shows an example computing environment in which a mobile computing system provides low-latency audiovisual streaming.

FIG. 2 is a schematic diagram depicting an example low-latency audiovisual streaming environment 200. A source client system 210 of environment 200 includes a computing platform 212, a camera 214, a microphone 216, graphical display device 218, audio speaker 220, and one or more user input devices 222. Mobile computing device 110 of FIG. 1 is a non-limiting example of source client system 210. However, source client system 210 may take other suitable forms, including computing devices that also incorporate components 212, 214, 216, 218, 220, 222, etc. into a single integrated enclosure, and computing systems that incorporate these components into multiple devices having separate enclosures.

Computing platform 212 may execute or otherwise implement a streaming program 230 that receives audio and/or video from multiple sources, processes the audio and/or video through a streaming pipeline 232, and outputs streaming packets 234 for delivery to a recipient. For example, streaming program 230 may receive a microphone audio stream 240 that is generated by microphone 216, a camera video stream 242 that is generated by camera 214, a game audio stream 244 of a game program 248, and a game video stream 246 of the game program 248. For example, microphone audio stream 240 and game audio stream 244 each may include a plurality of uncompressed audio frames, and camera video stream 242 and game video stream 246 each may include a plurality of uncompressed video frames. Game program 248 may be executed at computing platform 212 in at least some implementations. However, game program 248 may be at least partially remotely executed at a remote computing platform, such as server system 262 in other implementations.

Streaming program 230 may be distributed across two or more computing devices that collectively form computing platform 212. As an example, computing platform 212 may include one or more general-purpose processors and/or one or more special purpose logic machines (e.g., a video encoder). In this example, game streaming program 230 may include software executable by the one or more general-purpose processors, and may include firmware or hardware instructions executable by the one or more special purpose logic machines. Streaming program 230 may take any suitable form. For example, streaming program 230 may be implemented as a dedicated streaming application. In another example, streaming program 230 may be a component of an application, such as video game program 248. In another example, streaming program 230 may be implemented as a service. In still another example, streaming program 230 may be implemented by an operating system of source client system 210.

Graphical display device 218 may further present a game interface 252 of game program 248 as a component of GUI 250. Game interface 134 of FIG. 1 is a non-limiting example of game interface 252. Game interface 252 may correspond to a game view presented to a player of game program 248.

As will be described in further detail with reference to FIGS. 3 and 4, streaming pipeline 232 is configured to stream audio and video streams from multiple sources. Streaming pipeline 232 may encode different data streams based on the state of the streaming program 230 and/or the data streams received by the streaming program 230. For example, if the user is playing the video game program, then the streaming program 230 may receive four separate data streams: the microphone audio stream 240, the camera video stream 242, the game audio stream 244, and the game video stream 246. In another example, if the user is live-streaming content without interacting with the video game program 248, then the streaming program 230 may receive two separate data streams: the microphone audio stream 240 and the camera video stream 242. Streaming program 230 may facilitate the encoding, synchronization, and transmission of any suitable combination of different input data streams.

In some implementations, streaming pipeline 232 may be configured to package encoded audio and video streams together in the same streaming packets. In other implementations, streaming pipeline 232 may be configured to package the encoded audio stream into streaming audio packets and package the encoded video stream into separate streaming video packets. In other words, streaming pipeline 232 may be configured to process the audio streams and video streams together or separately.

Streaming pipeline 232 is configured to output streaming packets 234 to a remote client system 270 via a network transceiver 259. Network transceiver 259 may be configured to send streaming packets 234 to remote client system 270 via a communications network 260. Communication network 260 may include any suitable type of communication network. For example, communication network 260 may include a local area network, a wide area network, and/or another type of network. Network transceiver 259 may include wired and/or wireless communication hardware components compatible with one or more different communication protocols Network transceiver 259 may be configured to send streaming packets 234 to remote client system 270 according to any suitable wireless communication protocol.

In at least some implementations, server system 262 may receive streaming packets 234 that encode audio and video streams from source client system 210, and may facilitate the broadcast of the audio and video streams to a population of many remote client systems, such as remote client system 270. In other implementations, source client system 210 may stream audio and video directly to receiving client system 270 without the use of an intermediate server system. In some examples, the streaming program 230 may be configured to open a socket connection with server system 262 and/or remote client system 270 via network transceiver 259, and send streaming packets 234 substantially in real-time.

Remote client system 270 may include a graphical display device 272, a computing platform 274, and an audio speaker 276. Computing platform 274 may execute a media viewer program 290 that receives streaming audio and/or video data in the form of streaming packets from a source, such as source client system 210 or server system 262. Media viewer program 290 may be configured to decode the received streaming packets to extract the audio and video streams to facilitates the presentation of the streaming audio and/or video. For example, game video 280 and camera video 282 may be presented via graphical display 272, and mixed audio 286 may be output by audio speaker 276. Because the audio and video streams are synchronized prior to being packaged into the streaming packets by the streaming pipeline 232 of the source client system 210, media viewer program 290 does not have to buffer and synchronize the incoming audio and video streams. Although, in some implementations, remote client system 270 may perform buffering and/or synchronization operations on received streaming packets. For example, remote client system 270 may use a jitter buffer to properly order incoming streaming packets.

In the depicted example, mixed audio 286 corresponds to audio streamed by source client system 210, which includes microphone audio stream 240 and game audio stream 244. Also in this example, game video 280 corresponds to a visual representation of game video stream 246, and camera video 282 corresponds to a visual representation of camera video stream 242. Game video 280 and camera video 282 may be composited prior to streaming in at least some implementations. While game video and camera video are shown in FIG. 2 in a side-by-side configuration within a common GUI 284, it will be understood that other suitable configurations may be supported. For example, camera video 282 may be overlaid upon game video 280 or vice-versa. As another example, a user may selectively toggle between a view of game video 280 and a view of camera video 282. As such, game video 280 and camera video 282 may not be concurrently presented in at least some implementations.

Remote client system 270 may take any suitable form. For example, remote client system 270 may include one or more of a mobile computer (e.g., smartphone), a laptop computer, a desktop computer, a virtual-reality computer, an augmented-reality computer, and a gaming computer. Further, media viewer program 290 may be any suitable type of program configured to present digital media content. In one example, media viewer program 290 is a web browser. In another example, media viewer program 290 is incorporated into a video game program.

In the depicted example, low-latency streaming is discussed in terms of being sent from a mobile computing device, although it will be appreciated that low-latency streaming may be sent from other types of computing devices having different processing and storage capabilities.

Figure 3:
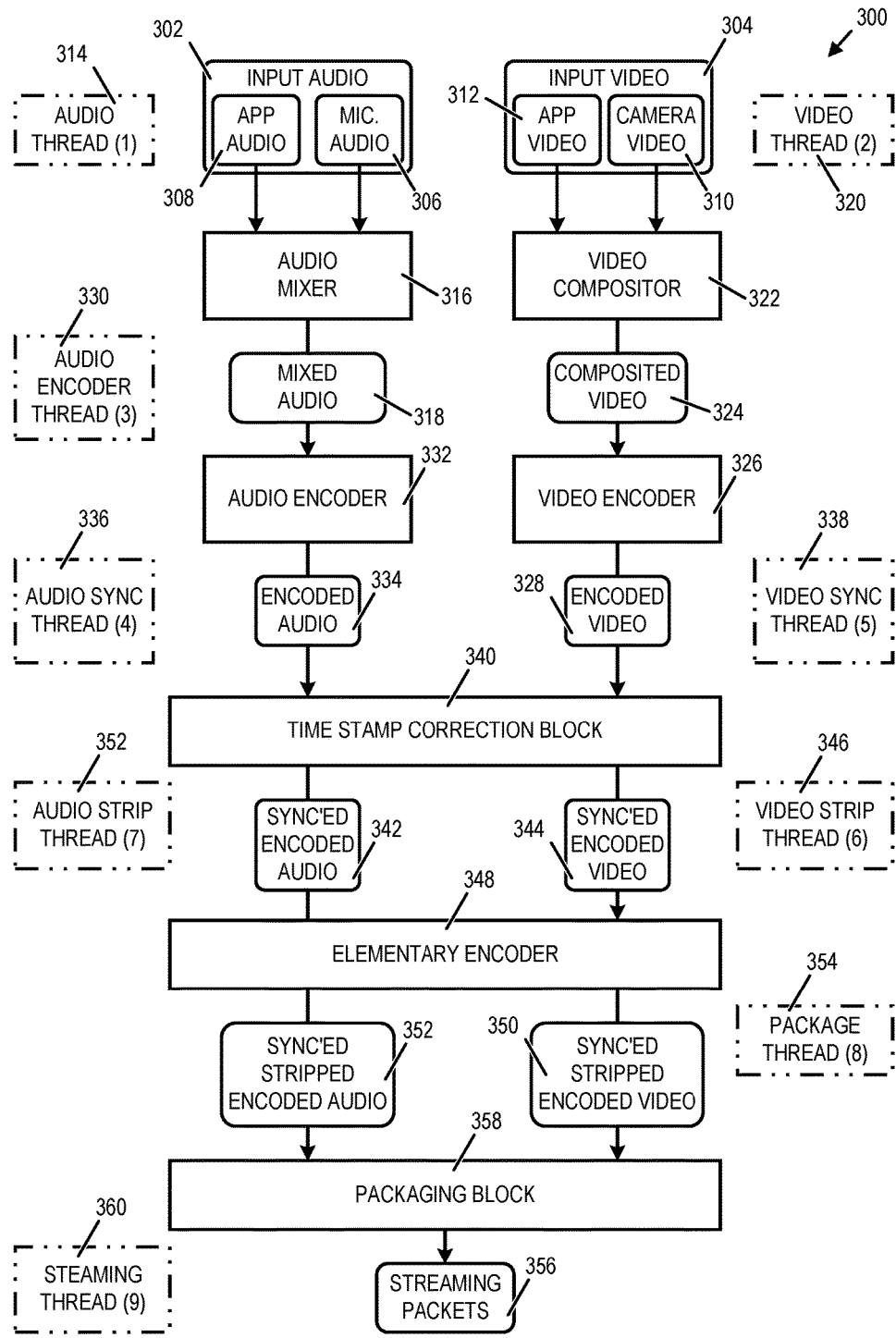
FIG. 3 schematically shows an example streaming pipeline.

FIG. 3 shows an example streaming pipeline 300. Streaming pipeline 232 of FIG. 2 is a non-limiting example of streaming pipeline 300. Streaming pipeline 300 is configured to receive input audio 302 and input video 304. Input audio 302 and input video 304 may include different data streams based on a state of a computing system (e.g., source client system 210 of FIG. 2) in which streaming pipeline 300 is implemented. For example, if a user is interacting with an application (e.g., playing a video game) that generates an audio stream, then input audio 302 may include uncompressed microphone audio stream 306 and uncompressed application audio stream 308. In some examples, microphone audio stream 306 and game audio stream 308 may be received by streaming pipeline 300 contemporaneously and in parallel. If the user is not interacting with an application, then streaming pipeline 300 may receive only uncompressed microphone stream 306 as input audio 302.

Furthermore, if the user is interacting with the application, and the application generates a video stream, then input video 304 may include uncompressed camera video stream 310 and uncompressed application video stream 312. If the user is not interacting with an application, then streaming pipeline 300 may receive only the uncompressed camera video stream 310 as input video 304.

Streaming pipeline 300 may be configured to spawn a plurality of processing threads to perform low-latency streaming operations. The different processing threads may be executed in parallel by one or more processors of the computing system that implements streaming pipeline 300. Different processing threads may be executed in parallel (e.g., by different processing cores) to allow for different operations of streaming pipeline 300 to be performed in parallel.

Streaming pipeline 300 is configured to spawn a first thread 314 configured to monitor for input audio (e.g., audio frames). When input audio 302 includes microphone audio stream 306 and application audio stream 308, streaming pipeline 300 is configured to mix the two audio streams into a single mixed audio stream 318 via an audio mixer 316. Audio mixer 316 may be configured to re-sample microphone audio stream 306 and application audio stream 308 from one or more different sampling rates to a common sampling rate in order to facilitate mixing of the two audio streams into mixed audio stream 318.

In some implementations, microphone audio stream 306 and application audio stream 308 may not be mixed into a single audio stream, and instead may be handled (e.g., encoded) separately by streaming pipeline 300.

Streaming pipeline 300 is configured to spawn a second thread 320 configured to monitor input video (e.g., video frames). When input video 304 includes camera video stream 310 and application video stream 312, streaming pipeline 300 is configured to composite the two video streams 310 and 312 into a single composited video stream 324 via a video compositor 322. In some implementations, video compositor 322 may be implemented in hardware. In other implementations, video compositor 322 may be implemented in software. In such implementations, an additional thread may be spawned to composite the two video streams 310 and 312 into composited video stream 324.

In some implementations, camera video stream 310 and application video stream 312 may not be composited into a single video stream, and instead may be handled (e.g., encoded) separately by streaming pipeline 300.

Streaming pipeline 300 is configured to encode composited video stream 324 via a video encoder 326 to produce an encoded video stream 328. In some implementations, video encoder 326 is a software video encoder. In some implementations, video encoder 326 is a hardware video encoder. In one example, hardware video encoder 326 is configured to encode composited video stream 324 according to the H.264 encoding format. Composited video stream 324 may be encoded using any suitable video encoder and/or encoding format. In some implementations, camera video stream 310 may be encoded as a picture-in-picture feature of the application video stream 312. In some implementations, background from camera video stream 310 may be subtracted so that the broadcasting user appears to float on top of the application video stream 312. In some implementations, only one or the other of camera video stream 310 and game video stream 312 may be encoded. In some implementations, video compositor 322 may be integrated into video encoder 326 such that compositing and encoding are performed during the same processing stage.

Streaming pipeline 300 is configured to spawn a third thread 330 configured to perform an audio encoding of the mixed audio stream 318 using an audio encoder 332 to produce an encoded audio stream 334. Streaming pipeline 300 may employ any suitable audio encoder to encode mixed audio stream 318. In some implementations, audio encoder 332 is a software audio encoder. In one example, software audio encoder 332 is configured to encode mixed audio stream 318 according to the Opus encoding format in order to comply with the WebRTC protocol. In some implementations, audio encoder 332 is a hardware audio encoder.

Note that in implementation where the video streams 310 and 312 are encoded using a hardware video encoder, a processing thread does not have to be spawned to perform the video encoding operation.

In some implementations, mixed audio stream 318 may be encoded via audio encoder 332 and composited video stream 324 may be encoded via video encoder 326 in parallel, albeit without a common clock reference.

Streaming pipeline 300 is configured to spawn a fourth thread 336 based on encoded audio stream 334 becoming available from audio encoder 332. The fourth thread 336 may be used to perform time stamp correction operations for encoded audio stream 334. Likewise, streaming pipeline 300 is configured to spawn a fifth thread 338 based on encoded video stream 328 becoming available from video encoder 326. The fifth thread 338 may be used to perform time stamp correction operations for encoded video stream 328.

Streaming pipeline 300 includes a time stamp correction block 340 (or a presentation time stamp (PTS) to decode time stamp (DTS) correction block). Time stamp correction block 340 is configured to align encoded audio stream 334 and encoded video stream 328 to temporally synchronize the audio and video streams in substantially real-time. Encoded audio stream 334 includes time stamps generated by audio encoder 332 according to a first clock reference. Encoded video stream 328 includes time stamps generated by video encoder 326 according to a second clock reference. The clock references for audio encoder 332 and video encoder 326 may be unsynchronized causing drift between encoded audio stream 334 and encoded video stream 328. Further, an encoding duration of the video stream may be greater than an encoding duration of the audio stream due to the video stream having a greater number of data bits to be encoded relative to the audio stream. This difference in encoding duration may cause drift between encoded audio stream 334 and encoded video stream 328. As such, time stamp correction block 340 is configured to resolve the time stamps of encoded audio stream 334 and encoded video stream 328 to temporally synchronize the encoded audio and video streams. In particular, time stamp correction block 340 is configured to estimate a time shift using a calculation derived from a time when each frame is received, a size (e.g., numbers of bytes) of each frame, and duration to encode each frame. The estimation may be used to shift audio frames of encoded audio stream 334 and/or video frames of encoded video stream 328 such that, at a minimum, an audio frame of encoded audio stream 334 falls between two video frames of encoded video stream 328.

Figure 4:
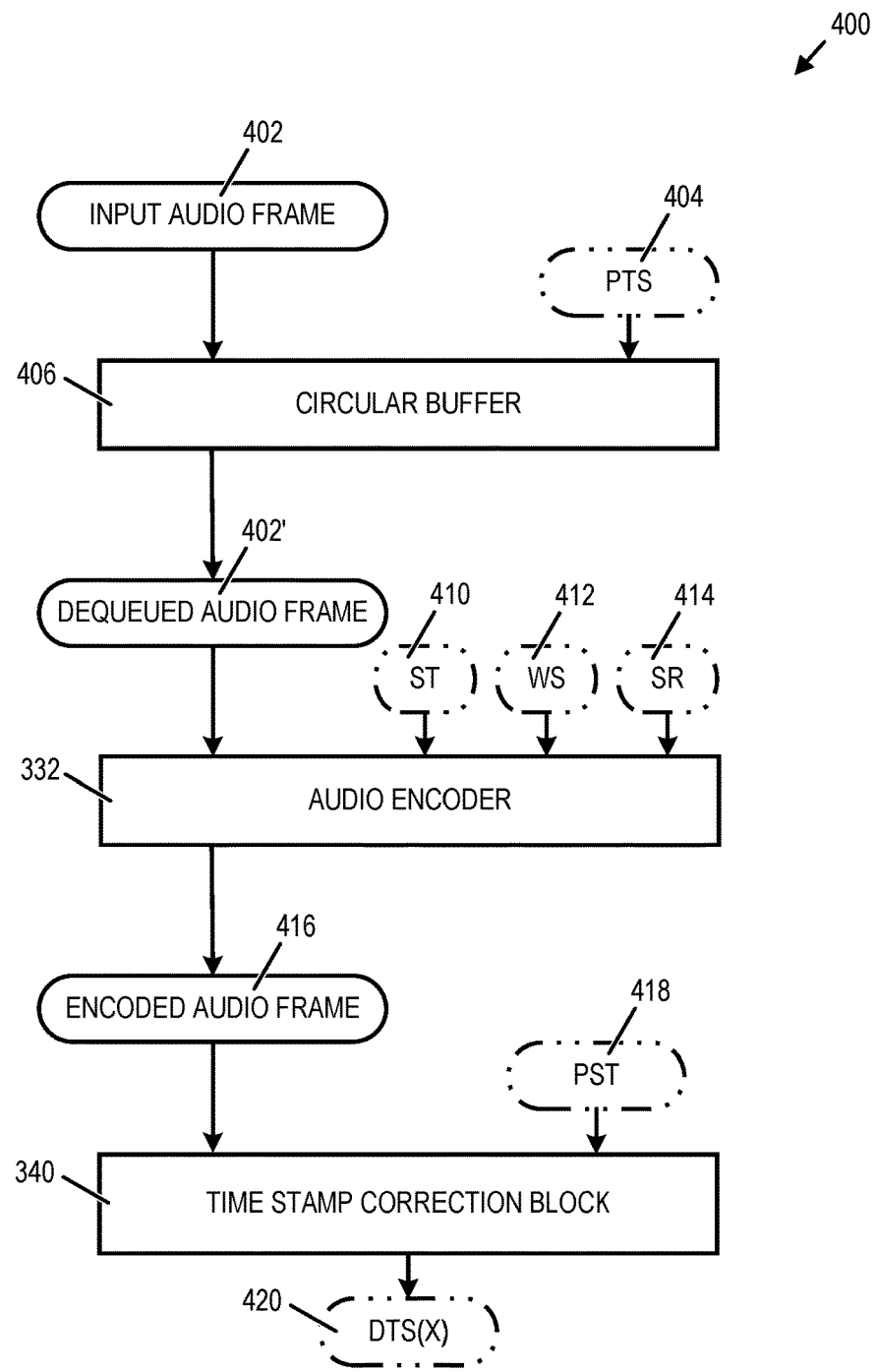
FIG. 4 shows an example approach for temporally synchronizing encoded audio and video streams.

FIG. 4 shows an example approach 400 for temporally synchronizing encoded audio and video streams. For example, synchronization approach 400 may be used by time stamp correction block 340 of streaming pipeline 300 of FIG. 3 to synchronize encoded audio stream 334 and encoded video stream 328. In the illustrated example, a time shift estimation is calculated for an audio frame of an audio stream, however the same type of calculation may be performed to estimate a time shift for a video frame of a video stream.

When an uncompressed input audio frame 402 is received by streaming pipeline 300, an incoming presentation time stamp (PTS) 404 is recorded for input audio frame 402. Input audio frame 402 is temporarily stored in a circular buffer 406 of streaming pipeline 300 until audio encoder 332 is available to encode audio frame 402. When audio encoder 332 becomes available, an audio frame 402' is dequeued from circular buffer 406 and passed to audio encoder 332 for encoding. Audio frame 402' may include the same audio information as input audio frame 402, however audio frame 402' may have a different size (in bytes) as a result of being stored in circular buffer 406. As such, a word size 412 and a frame size 414 is determined for audio frame 402'. When audio encoder 332 begins encoding audio frame 402', a system time (ST) 410 is recorded. Audio encoder 332 may encode audio frame 402' to produce an encoded audio frame 416. When encoded audio frame 416 is output from audio encoder 332, a post system time (PST) 418 is recorded. Time stamp correction block 340 is configured to calculate a time shift 420 of encoded audio frame 416 according to the equation:

$$DTS(x) = \sum_{n=1}^{frame\_size} (ST - PST) * \left(\frac{1}{Sample\_Rate * Channels * Word\_Size}\right) * 10000000$$

Where DTS(x) is the time shift 420 that is applied to the incoming PTS 404 of audio frame 416. By accounting for the word size and the frame size of the dequeued audio frame 402' in the equation, DTS(x) can be adjusted based on the size (e.g., number of bytes) of the dequeued audio frame 402'.

Time stamp correction block 340 is configured to calculate a time shift for audio frames in encoded audio stream 334 and video frames of encoded video stream 328 to synchronize the encoded audio and video streams. In other words, time stamp correction block 340 outputs a synchronized, encoded audio stream 342 and a synchronized, encoded video stream 344

The illustrated time shift estimation is provided as an example that is meant to be non-limiting. Time stamp correction block 340 may use any suitable time shift estimation to synchronize encoded audio stream 334 and encoded video stream 328.

Continuing with FIG. 3, streaming pipeline 300 is configured to spawn a sixth thread 346 based on synchronized, encoded video stream 344 becoming available from time stamp correction block 340. The sixth thread 346 is used to remove unnecessary metadata from synchronized, encoded video stream 344 via an elementary encoder 348. In particular, when composited video stream 324 is encoded using video encoder 326, metadata may be added to encoded video frames based on the encoding format used to encode composited video stream 324. For example, the encoded video frames of encoded video stream 328 may have metadata including a frame width, a frame height, a frame position in the video stream, a time stamp, an encoder manufacturer, a localized language, and other metadata. Not all of this metadata may be needed in order for the remote client system to present the video stream. As such, elementary encoder 348 is configured to remove at least some metadata from synchronized, encoded video stream 344 in order to reduce a stream size and thereby reduce transmission latency. Elementary encoder 348 is configured to output a stripped, synchronized, encoded video stream 350. In one example, video frames of stripped, synchronized, encoded video stream 350 have metadata only including the frame width and the frame height, and the other metadata added by video encoder 326 is stripped away.

Streaming pipeline 300 is configured to spawn a seventh thread 352 based on synchronized, encoded audio stream 342 becoming available from time stamp correction block 340. The seventh thread 352 is used to remove metadata from synchronized, encoded audio stream 342 via elementary encoder 348. Elementary encoder 348 is configured to output a stripped, synchronized, encoded audio stream 352.

In some implementations, the sixth and seventh threads and the elementary encoder may be omitted from streaming pipeline 300, and the synchronized, encoded audio and video streams may be packaged with additional metadata. In other implementations, the audio and video streams may be encoded without producing additional metadata. In other words, the audio and video streams may be encoded in a manner that generates only the necessary metadata. In such implementations, there would be no need to strip additional metadata from the encoded audio and video streams. As such, in some such implementations, elementary encoder 348 may be omitted from streaming pipeline 300.

Streaming pipeline 300 is configured to spawn an eighth thread 354 based on stripped, synchronized, encoded audio and video streams 352, 350 becoming available from the elementary encoder. The eighth thread 354 is used to package the stripped, synchronized, encoded audio and video streams 352, 350 into streaming packets 356 via a packaging block 358. Packaging block 358 may be configured to package audio and video streams 352, 350 into streaming packets 356 according to any suitable communication protocol. In one example, the audio and video streams 352, 350 are packaged into streaming packets 356 using the faster than light (FTL) streaming communication protocol.

In some implementations, streaming pipeline 300 may be configured to process audio data and video data separately to output separate audio streaming packets and video streaming packets without mixing the audio data and video data together in the same streaming packets.

Furthermore, in some implementations, the eighth thread 354 may be used to open a socket level connection with a computer network to upload the streaming packets 356 to a server system (e.g. server system 262 of FIG. 2) for distribution to different remote client systems. In other implementations, the eighth thread 354 may be used to open a socket level connection directly with a remote client system (e.g., remote client system 270 of FIG. 2) to send streaming packets 356 to the remote client system. Since the audio stream and the video stream are synchronized locally and directly, the FTL or other suitable protocol can send both the audio stream and the video stream using one socket. In contrast, other WebRTC streaming approaches, use two sockets—one for each stream. By using only one socket to send both streams, one less thread needs to be allocated to manage socket connections.

Streaming pipeline 300 is configured to spawn a ninth thread 360 to handle sending streaming packets 356 to server system 262 or remote client device 270.

In some implementations, processing pipeline 300 may be implemented using a computing system including a dual-core processor that is limited to processing two threads in parallel (e.g., a common processor for a mobile computing device). In such implementations, streaming pipeline 300 may be configured to manage a processor stack to give priority to operations associated with audio/video frames already being processed by streaming pipeline 300 before processing additional incoming audio/video frames. Such prioritization may reduce thread shifting to help lower latency. Moreover, such an approach may be broadly applicable to processors having a different number of cores. In other words, the prioritization of the in-pipeline audio and video frames may be based on the available number of processing cores and the priority of the operations being performed.

Streaming pipeline 300 enables uncompressed audio and video streams to be encoded, synchronized, and packaged into streaming packet(s) in a low-latency manner that enables substantially real-time streaming.

Figure 5:
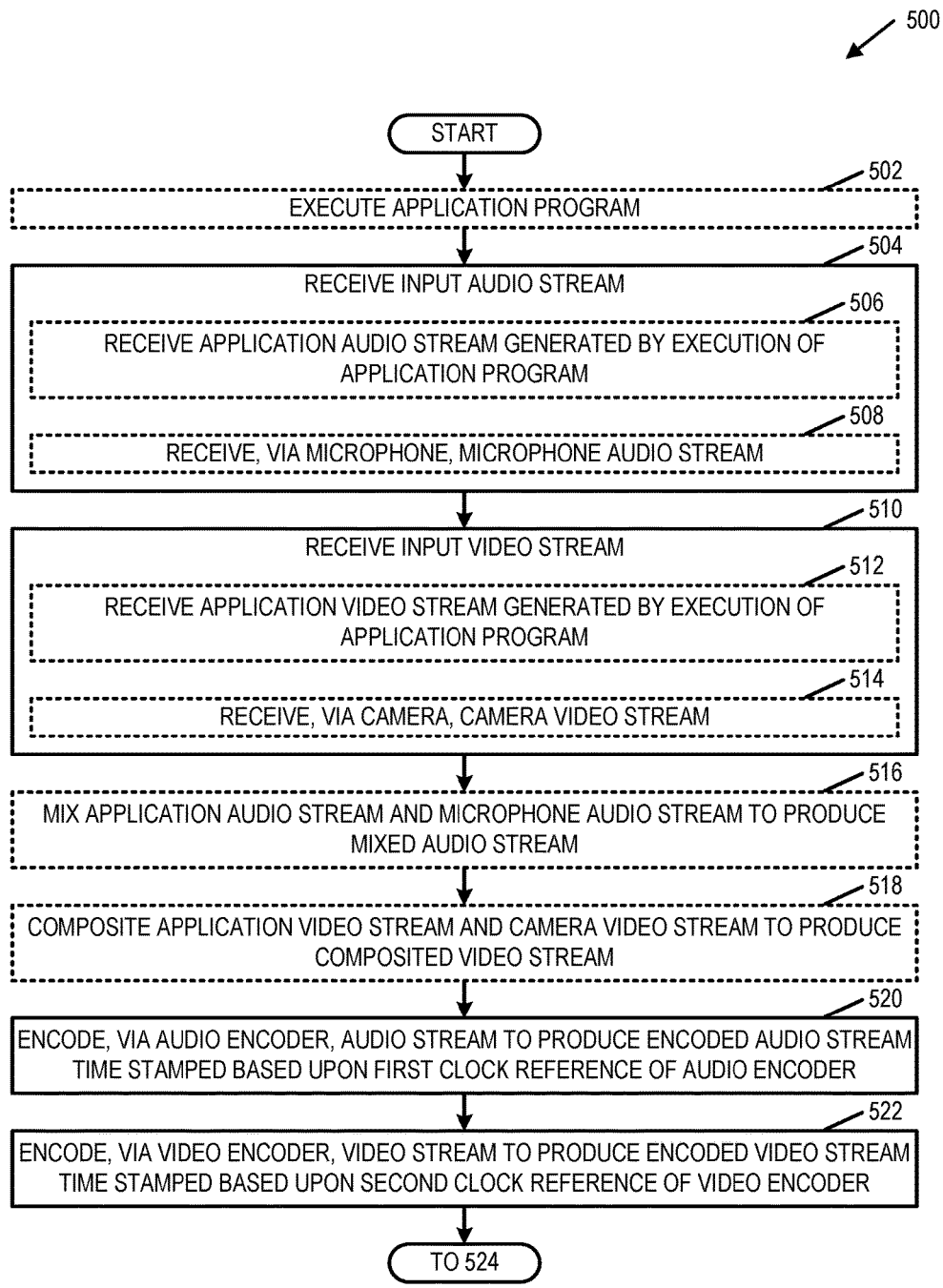
FIGS. 5 and 6 show an example method for streaming audio and video using a computing system.
Figure 6:
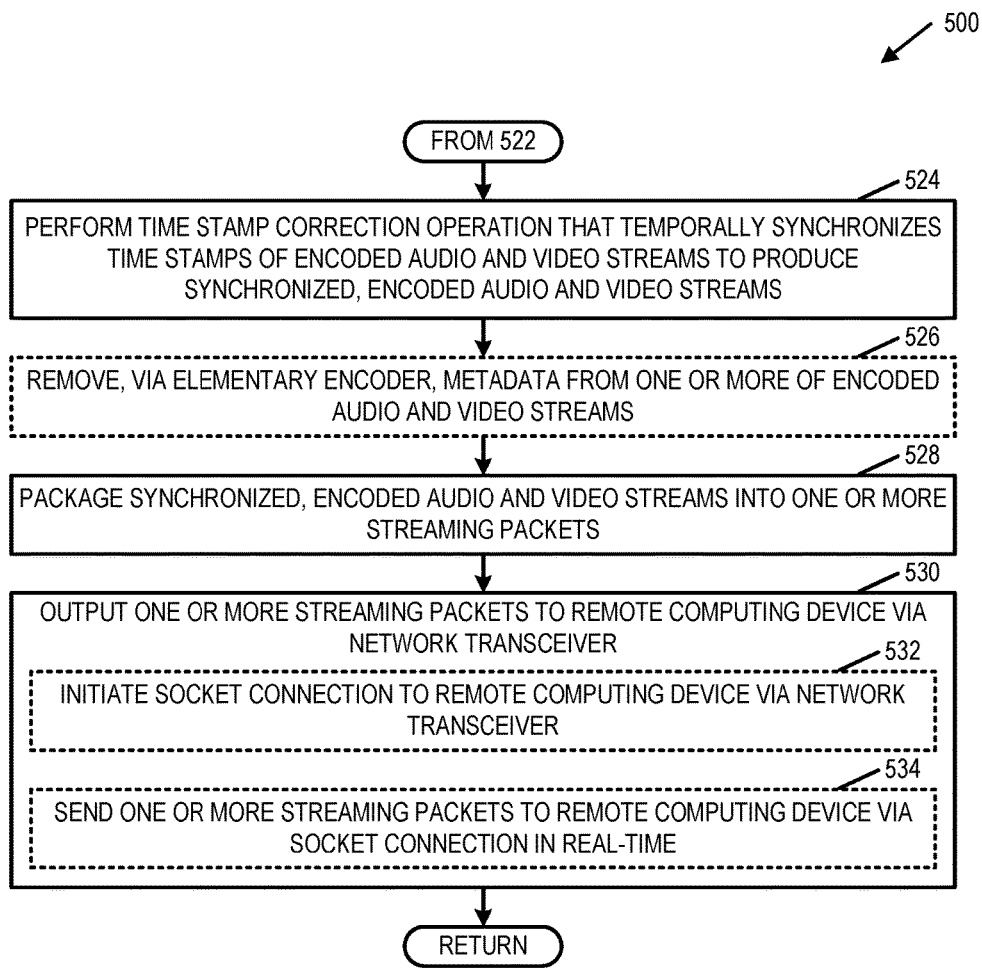

FIGS. 5 and 6 show an example method 500 for streaming audio and video using a computing system. Method 500 or portions thereof may be performed by a computing system including a streaming pipeline and executing a streaming program, such as source client system 210 previously described in FIG. 2. Upon execution of the streaming program, the streaming pipeline may initiate any number of process threads that are used to perform the various operations or processes of method 500, such as the processing threads previously described in FIG. 3.

At 502 of FIG. 5, method 500 includes executing an application program. For example, the application program may include a video game, a media player, a presentation program, or another application program with which a user may interact. At 504, method 500 includes receiving an audio input stream. In some examples, at 506, method 500 optionally may include receiving an application audio stream generated by execution of the application program. For example, when a user is playing a video game, the application audio stream may include sound from the video game. In some examples, at 508, method 500 optionally may include receiving a microphone audio stream generated via a microphone. For example, the microphone audio stream may include commentary spoken by the user while the user is playing the video game.

At 510, method 500 includes receiving an input video stream. In some examples, at 512, method 500 optionally may include receiving an application video stream generated by execution of the application program. For example, when a user is playing a video game, the application video stream may include video frames/gameplay from the video game. In some examples, at 514, method 500 optionally may include receiving a camera video stream generated via a camera. For example, the camera video stream may include video of the user while the user is playing the video game.

In some implementations where multiple audio streams are received as input—e.g., the application audio stream and the microphone audio stream, at 516, method 500 optionally may include mixing the application audio stream and the microphone audio stream to produce a mixed audio stream.

In some implementations where multiple video streams are received as input—e.g., the application video stream and the camera video stream, at 518, method 500 optionally may include compositing the application video stream and the camera video stream to produce a composited video stream.

At 520, method 500 includes encoding, via an audio encoder, the audio stream time stamped based upon a first clock reference of the audio encoder. At 522, method 500 includes encoding, via a video encoder, the video stream time stamped based upon a second clock reference of the video encoder.

At 524 of FIG. 6, method 500 includes performing a time stamp correction operation that temporally synchronizers times stamps of the encoded audio and video streams to produce synchronized, encoded audio and video streams. The audio encoder and the video encoder may provide separate unsynchronized time stamps based on the audio encoder and the video encoder having different clock references. In one example, the time stamp correction temporally shifts a time stamp of each audio frame of the encoded audio stream or each video frame of the encoded video stream according to an estimation based on one or more of a word size, a frame size, and an encoding duration of the audio frame or the video frame. The time stamp correction operation may be performed to synchronize the encoded audio and video streams in order to prevent drift between the encoded audio and video streams.

In some implementations, at 526, method 500 optionally may include removing, via an elementary encoder, metadata from one or more of the encoded audio and video streams.

At 528, method 500 includes packaging the synchronized, encoded audio and video streams into one or more streaming packets. In some examples, the audio stream and the video stream may be packaged separately into audio streaming packets and video streaming packets. In some examples, the audio and video streams may be packaged together in the same streaming packets.

At 530, method 500 includes outputting the one or more streaming packets to a remote computing device. In some examples, a network transceiver may send the one or more streaming packets to the remote computing device via a wireless local area network (e.g., WIFI) or a cellular wide area network.

In some implementations, at 532, method 500 optionally may include initiating a socket connection with the remote computing device via a network transceiver. At 534, method 500 optionally may including sending the one or more streaming packets to the remote computing device via the socket connection in substantially real-time.

In at least some implementations, the methods and processes described herein may be tied to a computing system of one or more computing devices. In particular, such methods and processes may be implemented as a computer-application program or service, an application-programming interface (API), a library, and/or other computer-program product.

Figure 7:
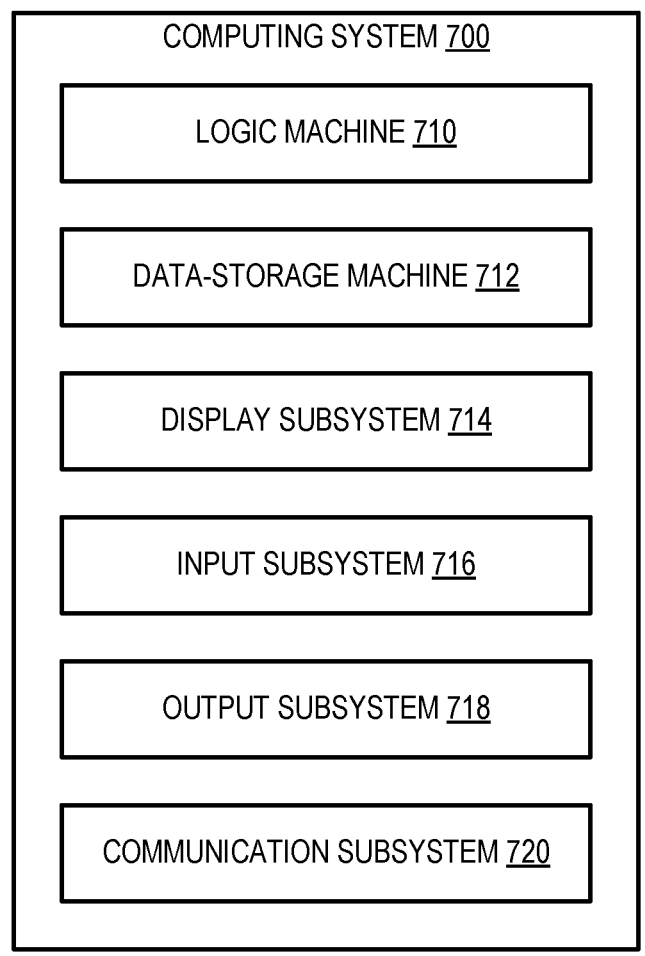
FIG. 7 shows an example computing system.

FIG. 7 schematically shows a non-limiting example of a computing system 700 that can enact one or more of the methods and processes described above. For example, computing system 700 may be representative of the various computing devices and/or computing platforms of FIG. 2 including source client system 210, remote client system 270, and server system 262. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 710 and a data-storage machine 712. Computing system 700 may optionally include a display subsystem 714 (e.g., an integrated or peripheral graphical display device), an input subsystem 716, an output subsystem 718, and a communication subsystem 720, and/or other components not shown in FIG. 7.

Logic machine 710 includes one or more physical devices configured to execute instructions. For example, logic machine 710 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 710 may include one or more processors configured to execute software instructions. Additionally or alternatively, logic machine 710 may include one or more hardware or firmware logic machines configured to execute hardware or firmware instructions. Processors of the logic machine may be single-core or multi-core, and the instructions executed thereon may be configured for sequential, parallel, and/or distributed processing. Individual components of logic machine 710 optionally may be distributed among two or more separate devices, which may be remotely located and/or configured for coordinated processing. Aspects of logic machine 710 may be virtualized and executed by remotely accessible, networked computing devices configured in a cloud-computing configuration.

Data-storage machine 712 includes one or more physical devices configured to hold instructions executable by logic machine 710 to implement the methods and processes described herein. When such methods and processes are implemented, the state of data-storage machine 712 may be transformed—e.g., to hold different data.

Data-storage machine 712 may include removable and/or built-in devices. Data-storage machine 712 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Data-storage machine 712 may include volatile, nonvolatile, dynamic, static, read/write, read-only, random-access, sequential-access, location-addressable, file-addressable, and/or content-addressable devices.

It will be appreciated that data-storage machine 712 includes one or more physical devices. However, aspects of the instructions described herein alternatively may be propagated by a communication medium (e.g., an electromagnetic signal, an optical signal, etc.) that is not held by a physical device for a finite duration. Furthermore, aspects of instructions described herein may reside on removable media devices.

Logic machine 710 and data-storage machine 712 may be collectively referred to as a computing platform, in some examples. Aspects of logic machine 710 and data-storage machine 712 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 710 executing instructions held by data-storage machine 712. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices. As an example, a service hosted at server system 272 of FIG. 2 may facilitate streaming from source client system 210 to a population of many receiving client systems of which receiving client system 270 is an example.

When included, display subsystem 714 may be used to present a visual representation of data held by data-storage machine 712. This visual representation may take the form of a graphical user interface (GUI). As the herein described methods and processes change the data held by the storage machine, and thus transform the state of the storage machine, the state of display subsystem 714 may likewise be transformed to visually represent changes in the underlying data. Display subsystem 714 may include one or more graphical display devices utilizing virtually any type of technology. Such display devices may be combined with logic machine 710 and/or data-storage machine 712 in a shared enclosure (e.g., as depicted with reference to mobile computing device 110 of FIG. 1). In other example, such display devices may be peripheral display devices.

When included, input subsystem 716 may comprise or interface with one or more user-input devices such as a keyboard, mouse, touch screen, game controller, microphone, inertial sensor, etc. For example, a microphone of input subsystem 716 may be integrated with a computing platform containing logic machine 710 and data-storage machine 712 via a common enclosure, or the microphone may be a peripheral device that is separate from and interfaces with the computing platform via one or more wired or wireless communication links. A wireless microphone may provide a microphone audio stream to a computing device over a wireless communications link using a wireless protocol, such as Bluetooth, as a non-limiting example.

In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, output subsystem 718 may comprise or interface with one or more output devices such as an audio speaker, a haptic feedback device (e.g., a vibration motor), etc. For example, an audio speaker of output subsystem 718 may be integrated with a computing platform containing logic machine 710 and data-storage machine 712 via a common enclosure, or the audio speaker may be a peripheral device that is separate from and interfaces with the computing platform via one or more wired or wireless communication links.

When included, communication subsystem 720 may be configured to communicatively couple computing system 700 with one or more other computing devices. Network transceiver 259 of FIG. 2 is an example of communication subsystem 720. Communication subsystem may include wired and/or wireless communication devices compatible with one or more different communication protocols. As non-limiting examples, the communication subsystem may be configured for communication via a wireless telephone network, or a wired or wireless local- or wide-area network. In some implementations, the communication subsystem may allow computing system 700 to send and/or receive messages to and/or from other devices via a network such as the Internet.

In an example, a mobile computing device for streaming audio and video comprises a microphone configured to generate a microphone audio stream, a camera configured to generate a camera video stream, a network transceiver configured to communicatively couple the mobile computing device with a remote computing device, a logic machine, and a data-storage machine holding instructions executable by a logic machine to receive an application audio stream generated by execution of an application program, receive an application video stream generated by execution of the application program, receive the microphone audio stream generated by the microphone, receive the camera video stream generated by the camera, mix the application audio stream and the microphone audio stream to produce a mixed audio stream, composite the application video stream and the camera video stream to produce a composited video stream, encode, via an audio encoder, the mixed audio stream to produce an encoded audio stream, encode, via a video encoder, the composited video stream to produce an encoded video stream, package the encoded audio and video streams into one or more streaming packets, and output the one or more streaming packets to the remote computing device via the network transceiver. In this example and/or other examples, the audio encoder may be configured to time stamp the encoded audio stream based upon a first clock reference of the audio encoder, the video encoder may be configured to time stamp the encoded video stream based upon a second clock reference of the video encoder, the storage machine may hold instructions executable by the logic machine to perform a time stamp correction operation that temporally synchronizes the time stamps of the encoded audio and video streams to produce synchronized, encoded audio and video streams, and the synchronized, encoded audio and video streams may be packaged into the one or more streaming packets. In this example and/or other examples, the time stamp correction operation may temporally shift a time stamp of audio frames of the encoded audio stream or video frames of the encoded video stream according to an estimation based on one or more of a word size, a frame size, and an encoding duration of the audio frames or the video frames. In this example and/or other examples, the data-storage machine may hold instructions executable by the logic machine to remove, via an elementary encoder, metadata from one or more of the encoded audio and video streams prior to packaging the encoded video stream into the one or more streaming packets. In this example and/or other examples, the mixed audio stream and the composited video stream may be encoded in parallel. In this example and/or other examples, the data-storage machine may hold instructions executable by the logic machine to initiate a socket connection to the remote computing device via the network transceiver, and send the one or more streaming packets to the remote computing device via the socket connection. In this example and/or other examples, the data-storage machine holds instructions executable by the logic machine to initiate a plurality of process threads to perform audio and video streaming via a streaming pipeline, and the process threads may be configured to prioritize processing operations associated with audio/video frames in the streaming pipeline over processing incoming audio/video frames received as input to the streaming pipeline. In this example and/or other examples, the one or more streaming packets may be output to a wireless local area network via the network transceiver. In this example and/or other examples, the one or more streaming packets may be output to a cellular wide area network via the network transceiver.

In an example, a method for streaming audio and video via a mobile computing device comprises receiving an application audio stream generated by execution of an application program, receiving an application video stream generated by execution of the application program, receiving, via a microphone, a microphone audio stream, receiving, via a camera, a camera video stream, mixing the application audio stream and the microphone audio stream to produce a mixed audio stream, compositing the application video stream and the camera video stream to produce a composited video stream, encoding, via an audio encoder, the mixed audio stream to produce an encoded audio stream, encoding, via a video encoder, the composite video stream to produce an encoded video stream, packaging the encoded audio and video streams into one or more streaming packets, and outputting, via a network transceiver, the one or more streaming packets to a remote computing device. In this example and/or other examples, the audio encoder may be configured to time stamp the encoded audio stream based upon a first clock reference of the audio encoder, the video encoder may be configured to time stamp the encoded video stream based upon a second clock reference of the video encoder, the storage machine may hold instructions executable by a logic machine to perform a time stamp correction operation that temporally synchronizes the time stamps of the encoded audio and video streams to produce synchronized, encoded audio and video streams, and the synchronized, encoded audio and video streams may be packaged into the one or more streaming packets. In this example and/or other examples, the time stamp correction operation may temporally shift a time stamp of audio frames of the encoded audio stream or video frames of the encoded video stream according to an estimation based on one or more of a word size, a frame size, and an encoding duration of the audio frames or the video frames. In this example and/or other examples, the method may further comprise removing, via an elementary encoder, metadata from one or more of the encoded audio and video streams prior to packaging the encoded video stream into the one or more streaming packets. In this example and/or other examples, the method may further comprise initiating a socket connection to the remote computing device via the network transceiver, and sending the one or more streaming packets to the remote computing device via the socket connection.

In an example, a mobile computing device for streaming audio and video comprising a network transceiver configured to communicatively couple the mobile computing device with a remote computing device, a logic machine, and a data-storage machine holding instructions executable by a logic machine to receive an input audio stream, receive an input video stream, encode, via an audio encoder, the input audio stream to produce an encoded audio stream time stamped based upon a first clock reference of the audio encoder, encode, via a video encoder, the input video stream to produce an encoded video stream time stamped based upon a second clock reference of the video encoder, perform a time stamp correction operation that temporally synchronizes time stamps of the encoded audio and video streams to produce synchronized, encoded audio and video streams, package the synchronized, encoded audio and video streams into one or more streaming packets, and output the one or more streaming packets to the remote computing device via the network transceiver. In this example and/or other examples, the input audio stream may be a mixed audio stream including an application audio stream and a microphone audio stream; and the input video stream may be a composited video stream including an application video stream and a camera video stream. In this example and/or other examples, the storage machine may hold instructions executable by the logic machine to remove, via an elementary encoder, metadata from one or more of the encoded audio and video streams prior to packaging the encoded video stream into the one or more streaming packets. In this example and/or other examples, the time stamp correction operation may temporally shift a time stamp of audio frames of the encoded audio stream or video frames of the encoded video stream according to an estimation based on one or more of a word size, a frame size, and an encoding duration of the audio frames or the video frames. In this example and/or other examples, the storage machine may hold instructions executable by the logic machine to initiate a socket connection to the remote computing device via the network transceiver, and send the one or more streaming packets to the remote computing device via the socket connection. In this example and/or other examples, the data-storage machine may hold instructions executable by the logic machine to initiate a plurality of process threads to perform audio and video streaming via a streaming pipeline, and the process threads may be configured to prioritize processing operations associated with audio/video frames in the streaming pipeline over processing incoming audio/video frames received as input to the streaming pipeline.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A mobile computing device for streaming audio and video, the mobile computing device comprising:
    a microphone configured to generate a microphone audio stream;
    a camera configured to generate a camera video stream;
    a network transceiver configured to communicatively couple the mobile computing device with a remote computing device;
    a logic machine; and
    a data-storage machine holding instructions executable by a logic machine to:
        receive an application audio stream generated by execution of an application program;
        receive an application video stream generated by execution of the application program;
        receive the microphone audio stream generated by the microphone;
        receive the camera video stream generated by the camera;
        mix the application audio stream and the microphone audio stream to produce a mixed audio stream;
        composite the application video stream and the camera video stream to produce a composited video stream;
        encode, via an audio encoder, the mixed audio stream to produce an encoded audio stream;
        encode, via a video encoder, the composited video stream to produce an encoded video stream;
        perform a time stamp correction operation that temporally synchronizes time stamps of the encoded audio and video streams to produce synchronized, encoded audio and video streams, wherein the time stamp correction operation temporally shifts a time stamp of audio frames of the encoded audio stream or video frames of the encoded video stream according to an estimation that is based on at least a size of each of the audio frames or the video frames;
        package the synchronized, encoded audio and video streams into one or more streaming packets; and
        output the one or more streaming packets to the remote computing device via the network transceiver.

2. The mobile computing device of claim 1, wherein the audio encoder is configured to time stamp the encoded audio stream based upon a first clock reference of the audio encoder, wherein the video encoder is configured to time stamp the encoded video stream based upon a second clock reference of the video encoder, and wherein the time stamp correction operation temporally synchronizes the time stamps of the encoded audio and video streams to produce the synchronized, encoded audio and video streams.

3. The mobile computing device of claim 2, wherein estimation is further based on one or more of a word size and an encoding duration of the audio frames or the video frames.

4. The mobile computing device of claim 1, wherein the data-storage machine holds instructions executable by the logic machine to:
    remove, via an elementary encoder, metadata from one or more of the encoded audio and video streams prior to packaging the synchronized, encoded video stream into the one or more streaming packets.

5. The mobile computing device of claim 1, wherein the mixed audio stream and the composited video stream are encoded in parallel.

6. The mobile computing device of claim 1, wherein the data-storage machine holds instructions executable by the logic machine to:
    initiate a socket connection to the remote computing device via the network transceiver; and
    send the one or more streaming packets to the remote computing device via the socket connection.

7. The mobile computing device of claim 1, wherein the data-storage machine holds instructions executable by the logic machine to:
    initiate a plurality of process threads to perform audio and video streaming via a streaming pipeline, and wherein the process threads are configured to prioritize processing operations associated with audio/video frames in the streaming pipeline over processing incoming audio/video frames received as input to the streaming pipeline.

8. The mobile computing device of claim 1, wherein the one or more streaming packets are output to a wireless local area network via the network transceiver.

9. The mobile computing device of claim 1, wherein the one or more streaming packets are output to a cellular wide area network via the network transceiver.

10. A method for streaming audio and video via a mobile computing device, the method comprising:
    receiving an application audio stream generated by execution of an application program;
    receiving an application video stream generated by execution of the application program;
    receiving, via a microphone, a microphone audio stream;
    receiving, via a camera, a camera video stream;
    mixing the application audio stream and the microphone audio stream to produce a mixed audio stream;
    compositing the application video stream and the camera video stream to produce a composited video stream;
    encoding, via an audio encoder, the mixed audio stream to produce an encoded audio stream;
    encoding, via a video encoder, the composite video stream to produce an encoded video stream;
    performing a time stamp correction operation that temporally synchronizes time stamps of the encoded audio and video streams to produce synchronized, encoded audio and video streams, wherein the time stamp correction operation temporally shifts a time stamp of audio frames of the encoded audio stream or video frames of the encoded video stream according to an estimation that is based on at least a size of each of the audio frames or the video frames;
    packaging the synchronized, encoded audio and video streams into one or more streaming packets; and
    outputting, via a network transceiver, the one or more streaming packets to a remote computing device.

11. The method of claim 10, wherein the audio encoder is configured to time stamp the encoded audio stream based upon a first clock reference of the audio encoder, wherein the video encoder is configured to time stamp the encoded video stream based upon a second clock reference of the video encoder, and wherein the time stamp correction operation temporally synchronizes the time stamps of the encoded audio and video streams to produce the synchronized, encoded audio and video streams.

12. The method of claim 11, wherein the estimation is further based on one or more of a word size and an encoding duration of the audio frames or the video frames.

13. The method of claim 10, further comprising:
removing, via an elementary encoder, metadata from one or more of the encoded audio and video streams prior to packaging the synchronized, encoded video stream into the one or more streaming packets.

14. The method of claim 10, further comprising:
initiating a socket connection to the remote computing device via the network transceiver; and
sending the one or more streaming packets to the remote computing device via the socket connection.

15. A mobile computing device for streaming audio and video, the mobile computing device comprising:
a network transceiver configured to communicatively couple the mobile computing device with a remote computing device;
a logic machine; and
a data-storage machine holding instructions executable by a logic machine to:
receive an input audio stream;
receive an input video stream;
encode, via an audio encoder, the input audio stream to produce an encoded audio stream time stamped based upon a first clock reference of the audio encoder;
encode, via a video encoder, the input video stream to produce an encoded video stream time stamped based upon a second clock reference of the video encoder;
perform a time stamp correction operation that temporally synchronizes time stamps of the encoded audio and video streams to produce synchronized, encoded audio and video streams, wherein the time stamp correction operation temporally shifts a time stamp of audio frames of the encoded audio stream or video frames of the encoded video stream according to an estimation that is based on at least a size of each of the audio frames or the video frames;
package the synchronized, encoded audio and video streams into one or more streaming packets; and
output the one or more streaming packets to the remote computing device via the network transceiver.

16. The mobile computing device of claim 15, wherein the input audio stream is a mixed audio stream including an application audio stream and a microphone audio stream; and wherein the input video stream is a composited video stream including an application video stream and a camera video stream.

17. The mobile computing device of claim 15, wherein the storage machine holds instructions executable by the logic machine to:
remove, via an elementary encoder, metadata from one or more of the encoded audio and video streams prior to packaging the synchronized, encoded video stream into the one or more streaming packets.

18. The mobile computing device of claim 15, wherein the estimation is further based on one or more of a word size and an encoding duration of the audio frames or the video frames.

19. The mobile computing device of claim 15, wherein the storage machine holds instructions executable by the logic machine to:
initiate a socket connection to the remote computing device via the network transceiver; and
send the one or more streaming packets to the remote computing device via the socket connection.

20. The mobile computing device of claim 15, wherein the data-storage machine holds instructions executable by the logic machine to:
initiate a plurality of process threads to perform audio and video streaming via a streaming pipeline, and wherein the process threads are configured to prioritize processing operations associated with audio/video frames in the streaming pipeline over processing incoming audio/video frames received as input to the streaming pipeline.

* * * * *